United States Patent [19]

Nakashima et al.

[11] 4,328,514

[45] May 4, 1982

[54] CRT DRIVE CIRCUIT COMPRISING WHITE AND BLACK LEVEL CLAMPING CIRCUITRY

[75] Inventors: Akio Nakashima; Yoshimasa Okamoto, both of Yokohama, Japan

[73] Assignee: Hitachi, Ltd., Japan

[21] Appl. No.: 191,830

[22] Filed: Sep. 29, 1980

[30] Foreign Application Priority Data

Sep. 28, 1979 [JP] Japan .................. 54/124070

[51] Int. Cl.³ .................. H04N 5/18; H04N 9/535
[52] U.S. Cl. .................. 358/33; 358/34; 358/170; 358/171
[58] Field of Search .................. 358/33, 34, 39, 40, 358/74, 170, 171, 172

[56] References Cited

U.S. PATENT DOCUMENTS 3,729,577 4/1973 Buell .................. 358/34

Primary Examiner—Robert L. Richardson
Attorney, Agent, or Firm—Craig and Antonelli

[57] ABSTRACT

A CRT drive circuit for amplifying a video signal applied through a video signal transmission cable to a level sufficient to drive a CRT wherein a circuit for clamping the video signal to a white level during the entire period when the cable is disconnected is provided at an input stage, a blanking circuit for clamping the video signal to a black level during a flyback period is provided in an intermediate stage, and a D.C. restore circuit for clamping the black level of the video signal output to a level corresponding to a black level input to the CRT is provided at an output stage. When the cable is disconnected, the entire display area of the CRT screen displays white so that the CRT drive circuit can be readily checked for proper operation.

6 Claims, 5 Drawing Figures

(a) SYNC. SIGNAL
(b) VIDEO INPUT — WHITE LEVEL / BLACK LEVEL
(c) INTERMEDIATE VIDEO OUTPUT
(d) BLANKING SIGNAL
(e) VIDEO OUTPUT — BLACK LEVEL / WHITE LEVEL

CRT DRIVE CIRCUIT COMPRISING WHITE AND BLACK LEVEL CLAMPING CIRCUITRY

BACKGROUND OF THE INVENTION

1. Field of the Invention

The present invention relates to a CRT drive circuit, and more particularly to a CRT drive circuit in a CRT display device which can be used as a computer terminal.

2. Description of the Prior Art

A prior art which is pertinent to the present invention is explained in conjunction with FIG. 1 which shows a block diagram of a CRT drive circuit in a color display device which can be used as a computer terminal. The prior art shown in FIG. 1 is disclosed in pages 143 and 144 of collected papers for lecture to The Institute of Television Engineers of Japan, published on July 1, 1980. In FIG. 1, three video signals corresponding to red, blue and green and consisting of time sequence pulses are applied to video input terminals 10, 12 and 14, respectively, and thence to video amplifier circuits 16, 18 and 20, respectively. As represented by the circuit 16, each of the video amplifier circuits 16, 18 and 20 includes an impedance matching resistor 22, a video preamplifier 24, a video power amplifier 26 and a D.C. restore circuit 28. A synchronizing signal is applied to a synchronizing signal input terminal 30 and amplified in a synchronizing signal amplifier circuit 32 and the amplified signal is then supplied to the video amplifier circuits 16, 18 and 20. A blanking signal for erasing horizontal flyback lines is applied to a terminal 34, thence to a blanking circuit 36. The blanking signal is usually derived by damping horizontal flyback pulses. Outputs from the video amplifier circuits 16, 18 and 20 are supplied to a cathode of a CRT 38.

The terminals 10, 12, 14 and 30 are connected to a video signal transmission cable. The video signal applied to the terminal 10 has a waveform as shown in FIG. 2(b), which is amplified by the preamplifier 24 to produce a waveform shown in FIG. 2(c) which is analoguous to that of FIG. 2(b). The blanking signal shown in FIG. 2(d) renders a transistor 40 of a blanking circuit 36 ON during a high level period or a blanking period so that the outputs of the preamplifiers 24 of the video amplifiers 16, 18 and 20 are clamped to zero level through diodes 42, 44 and 46, respectively. This zero level corresponds to a black level of the video signal. Accordingly, the intermediate video signal shown in FIG. 2(c) is clamped to the black level of the video signal during the blanking period and it is phase-inverted by the video output amplifier 26 an output of which is fed to the D.C. restore circuit, thence to the cathode of the CRT 38. The video signal consists of a pulse wave which essentially includes only high level and low level. Accordingly, the preamplifier 24 may be regarded as a gate circuit and the video power amplifier 26 may be regarded as an inverter circuit.

The synchronizing signal shown in FIG. 2(a) is supplied to the D.C. restore circuit 28 through a capacitor 50. A capacitor 52 in the D.C. restore circuit 28 has a relatively large capacitance so that it exhibits substantially no impedance to the synchronizing signal. It is charged to the voltage corresponding to the black level input of the CRT by a voltage derived by dividing a +B power supply voltage by a dividing potentiometer 54. A coupling capacitor 56 functions to block a D.C. component of the video signal and pass only an A.C. component. It is charged by the +B power supply through a resistor 58. When the synchronizing signal shown in FIG. 2(a) is supplied to the D.C. restore circuit through the capacitor 50, a positive voltage is applied to a base of a transistor 62 through a resistor 60 during the pulse period so that the transistor 62 is rendered ON during that period and the potential at the junction of the capacitor 56 and the resistor 58 falls to the potential of the capacitor 52 (black level). The potential (black level) at the junction is held by the capacitor 56 immediately after the transistor 62 is turned off and it gradually rises with time by the +B power supply. As shown in FIG. 2, since the synchronizing signal (a) is included in the pulse width of the blanking signal (d), the black level of the video signal is restored by the D.C. restore circuit 28. Accordingly, a video signal as shown in FIG. 2(e) appears at the junction of the capacitor 56 and the resistor 58. The voltage between the black level and the zero level corresponds to the voltage across the capacitor 52. A diode 64 has a back current blocking function.

In this circuit, if the synchronizing signal is lost, the D.C. restore circuit 16 does not operate and the D.C. level of the video signal at the output of the video amplifier circuit shifts to the level of the +B power supply. As a result, a deep bias is created between the cathode and the grid of the CRT and electron beams are hardly emitted. Consequently, no image is produced and one may misunderstand that a significant trouble has occurred in spite of the fact that the CRT drive circuit operates properly. When the video signal is lost, the input to the preamplifier 24 assumes low level and no light appears on the CRT screen. In such a case, there is no simple way to check whether the CRT drive circuit operates properly.

SUMMARY OF THE INVENTION

It is an object of the present invention to provide a CRT drive circuit in a CRT display device which can be used as a computer terminal, which circuit can be readily checked for proper operation.

It is another object of the present invention to provide a CRT drive circuit in a color CRT display device which can be used as a computer terminal, which circuit can be checked for proper operation and indicate by color display on a screen which one of the three video amplifier circuits is in trouble.

It is a further object of the present invention to provide a CRT drive circuit in a color CRT display device which can be used as a computer terminal, which circuit is easy to white level adjustment.

A CRT drive circuit in accordance with the present invention is so constructed that when a video signal transmission cable connected to an input terminal of the CRT drive circuit is disconnected, an entire display area on a CRT screen appears white. In order to attain the above function, the circuit is constructed such that when the cable is disconnected a white level voltage is continuously applied to a video input circuit, and during a horizontal flyback period a video amplifier circuit functions to shift the video signal to a black level by a blanking signal and a D.C. restore circuit functions as a peak clamping circuit to clamp the video signal to the black level.

DESCRIPTION OF THE PREFERRED EMBODIMENTS

Figure 1:
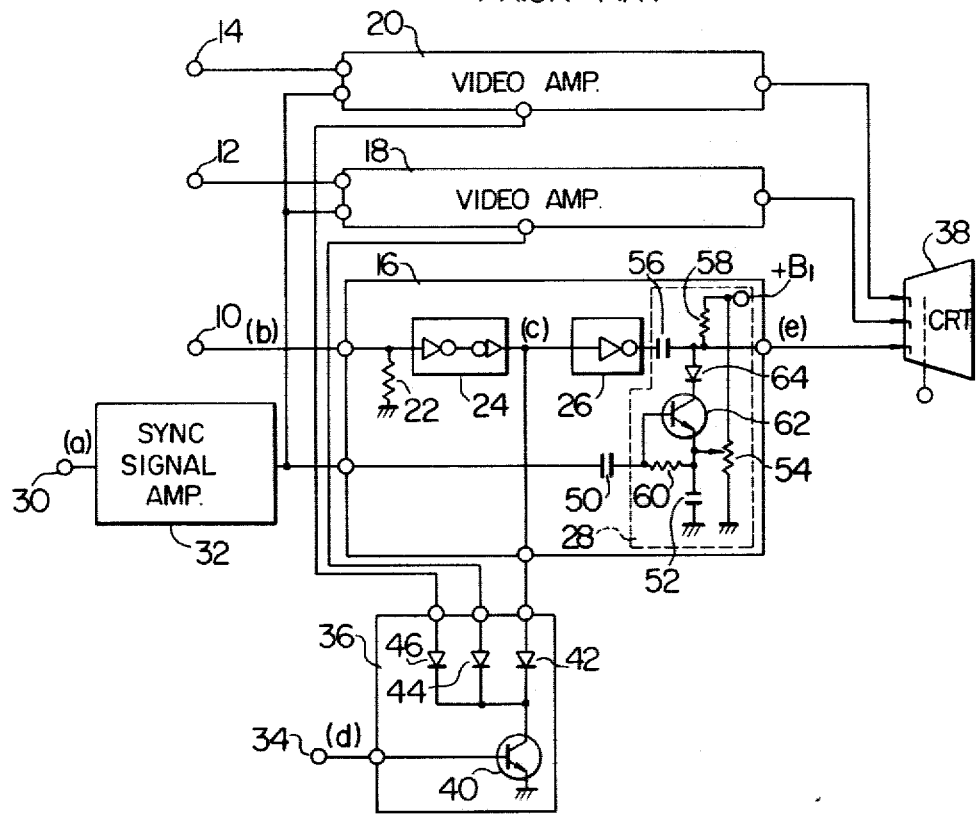
FIG. 1, consisting of a–e, shows a block diagram of a prior art CRT drive circuit which relates to the present invention.
Figure 2:
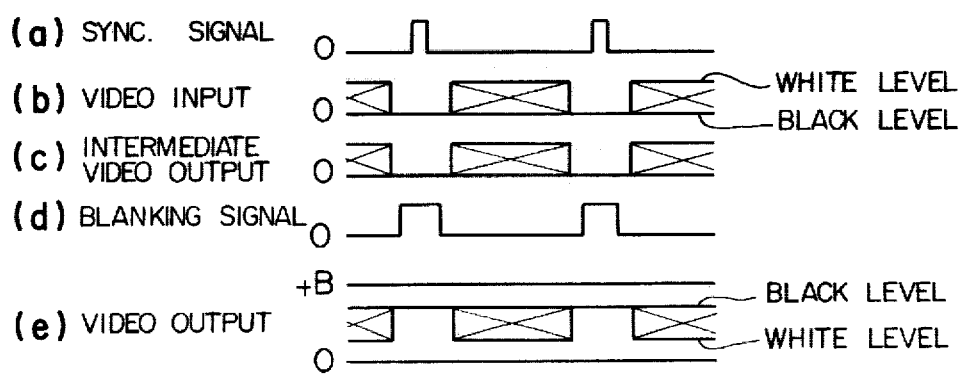
FIG. 2 shows waveforms in the circuit of FIG. 1 used to explain the operation of the circuit.
Figure 3:
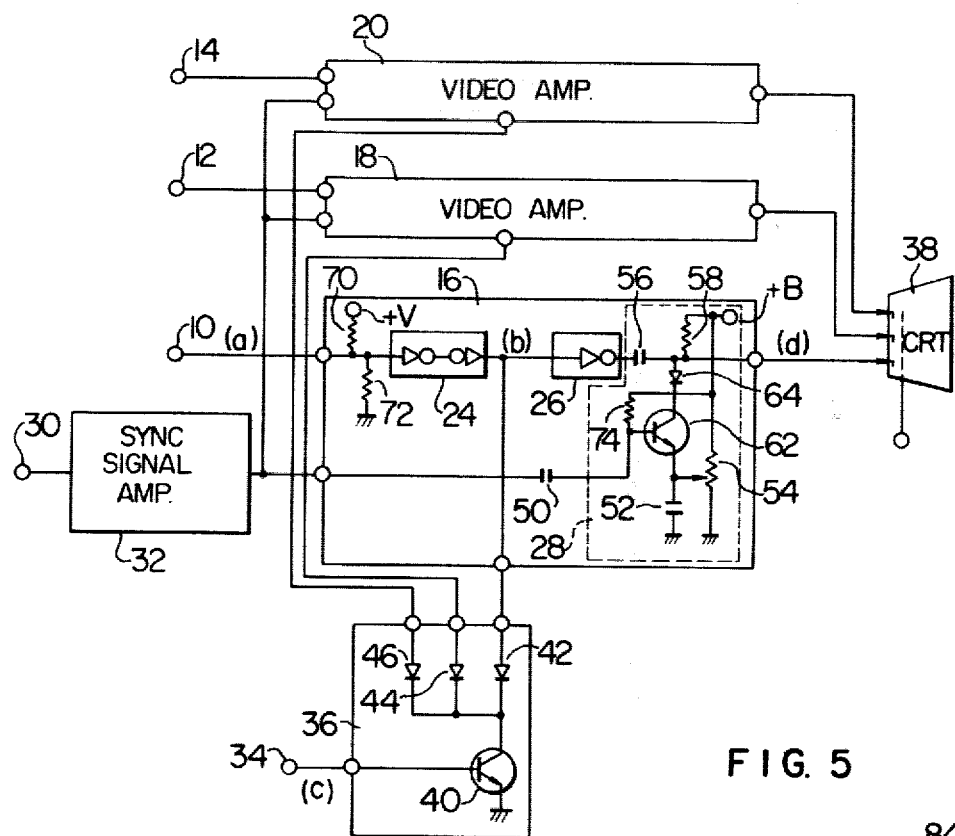
FIG. 3 shows a block diagram of a CRT drive circuit in accordance with one embodiment of the present invention.

FIG. 3 shows a block diagram of one embodiment of the present invention. Since many of the components shown are identical to those shown in FIG. 1 and function in the same manner, the components corresponding to those shown in FIG. 1 are designated by the like numerals. The operations which are identical to those explained in connection with FIG. 1 are not explained here to avoid the duplication.

According to the present invention, when the video signal transmission cable is disconnected from the input terminals 10, 12, 14 and 30, input voltages to the preamplifiers 24 for the video amplifier circuits 16, 18 and 20 are clamped to a white level. When the cable is disconnected from the input terminals, the input terminals are open-ended and a voltage derived by dividing the power supply voltage +V (volts) by resistors 70 and 72 is applied to the input of the preamplifier 24. This divided voltage is preset to a voltage corresponding to the white level of the video signal. Since the video signal used in the present invention assumes only two levels, high level and low level, the divided voltage need only be higher than a threshold level of the preamplifier 24. However, it is necessary that when the video signal assumes the low level as the cable is connected to the input terminals, the input voltage to the preamplifier 24 is sufficiently lower than the threshold level. To this end, it is desirable that the divided voltage by the resistors 70 and 72 when the input terminal 10 is open does not exceed the threshold level too much.

Figure 4:
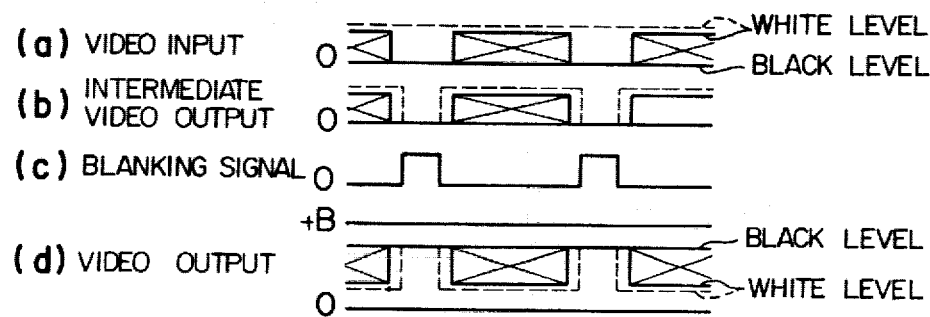
FIG. 4, consisting of a–d, shows waveforms in the circuit shown in FIG. 3 used to explain the operation of the circuit.

FIG. 4(a) shows an input signal waveform of the preamplifier 24, in which a solid line shows a waveform when the cable is connected to the terminal 10 and the video signal is applied to the circuit while a broken line shows a signal waveform when the cable is disconnected and the video signal is not applied to the circuit. In this case it is a white level signal over the entire period. The video signal is forced to the black level by the blanking circuit 36 during the period of a blanking signal shown in FIG. 4(c) at a point intermediate the preamplifier 24 and the power amplifier 26. Accordingly, in the intermediate video output at the intermediate point, the entire white level signal shown in FIG. 4(a) when the cable is disconnected is converted to the black level signal during the blanking period.

In the D.C. restore circuit 28, the base of the transistor 62 is connected to the +B power supply through the resistor 74 to establish a fixed biasing circuit. The transistor 62 is turned on by a synchronizing signal applied to the terminal 30. Since the synchronizing signal is included in the blanking period, the black level of the video output signal is clamped to the charged voltage for the capacitor 52. During the period other than the synchronizing signal period, the transistor 62 is turned off by the charged voltage for the capacitor 50 which is charged by a base current due to the synchronizing signal. When the synchronizing signal is not received at the terminal 30, the transistor 62 which has its base fixedly biased and its collector connected to the diode 64 is turned on only when the collector potential is higher than the emitter potential. The video signal shown in FIG. 4(b) is phase-inverted by the video power amplifier 26 and the black level is clamped to the voltage across the capacitor 52. As a result, the waveform shown in FIG. 4(d) appears. The circuit 28 thus constitutes a peak clamping circuit. When the cable is not connected to the input terminals, the black level is clamped as shown by the broken line in FIG. 4(d) and the signal assumes the white level during the period other than the clamp period.

Figure 5:
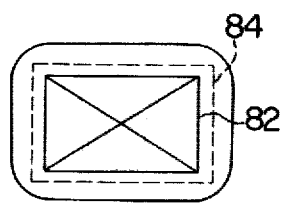
FIG. 5 illustrates an image on a CRT screen driver by the circuit shown in FIG. 3.

FIG. 5 shows a CRT screen, on which information is displayed in a solid line area 82 when the cable is connected to the terminal. When the cable is not connected to the terminal, the entire area circled by a broken line 84 is displayed white. The broken line area is broader than the solid line area because the period in which the video information is present (solid line rectangular area) is shorter than the white level period shown by the broken line and several vertical scan lines do not usually carry the video information.

As explained above, according to the present invention, when the normal signal is applied through the video signal transmission cable the circuit operates normally, and when the video signal transmission cable is disconnected the entire area 84 of the CRT displays a white pattern. Accordingly, if no pattern is displayed on the screen, the CRT drive circuit can be checked for proper operation by disconnecting the cable. If no raster appears or the raster appears cyan or mazenta when the cable is disconnected from the terminal, it is determined that a trouble exists in the CRT drive circuit or the CRT per se.

Furthermore, a color phase can be adjusted by watching the color on the screen while the cable is disconnected. Furthermore, since the input signal cable need not be connected in the aging operation during the manufacture of the CRT drive circuit and the heat run operation before the adjustment, manufacturing efficiency can be enhanced.

While the CRT drive circuit for the color display device has been specifically explained, a single video amplifier may be used for a black and white CRT display device without departing from the scope of the present invention.

In the embodiment shown in FIG. 3, the circuit which renders the video signal to assume the white level when the video signal transmission cable is disconnected from the input terminal of the CRT drive circuit is provided at the input stage. Alternatively, this circuit may be inserted at any point between the input stage and the blanking signal insertion circuit.

In the embodiment explained above, the D.C. restore circuit functions to peak-clamp the signal by the synchronizing signal when the cable is connected to the input terminal and it merely peak-clamps the signal to the black level when the cable is disconnected and the synchronizing signal is not received. Alternatively, the D.C. restore circuit may be a peak clamp circuit which operates independently of the synchronizing signal.

In the embodiment shown in FIG. 3, the blanking circuit is connected with the junction between the video preamplifier and video power amplifier. Alternatively, the blanking circuit may be connected with an input terminal other than the video input terminal in the video power amplifier so as to clamp the video signal output to the black level.

What is claimed is:

1. A CRT drive circuit comprising:
   (a) a video signal input terminal to which a video signal transmission cable is to be connected;
   (b) a video amplifier circuit for amplifying a video signal applied to said input terminal to a level sufficient to drive a CRT;
   (c) a blanking circuit for clamping a video signal output from said video amplifier circuit to a black level for at least a flyback period;
   (d) a white level clamping circuit connected in said video amplifier circuit between said input terminal and said blanking circuit for clamping said video signal to a level corresponding to a white level when said cable is not electrically connected to said input terminal; and
   (e) a D.C. restore circuit for clamping the black level of said video signal output to a level corresponding to a black level input to said CRT by a peak clamping circuit.

2. A CRT drive circuit according to claim 1 wherein said white level clamping circuit produces a white level voltage by dividing a D.C. power supply voltage by a resistor dividing circuit.

3. A CRT drive circuit according to claim 1 or 2 wherein said white level clamping circuit is connected to said input terminal.

4. A CRT drive circuit according to claim 1 wherein said D.C. restore circuit clamps said video signal during a synchronizing signal period when a synchronizing signal is received and peak-clamps said video signal by the black level of said video signal when the synchronizing signal is not received.

5. A CRT drive circuit according to claim 4 wherein said D.C. restore circuit includes a switching transistor having a base connected to a fixed bias circuit, said synchronizing signal being applied to said base of said transistor through a coupling capacitor.

6. A CRT drive circuit comprising:
   (a) three input terminals for three color signals to which a video signal transmission cable for transmitting said three color signals is to be connected;
   (b) three video amplifier circuits for amplifying video signals applied to said input terminals to a level sufficient to drive a CRT;
   (c) a blanking circuit for clamping the video signals at the outputs of said video amplifier circuits to a black level during a blanking period in which a synchronizing signal is included;
   (d) three white level clamping circuits connected in said video amplifier circuits respectively between said input terminals and said blanking circuit for clamping the video signals to a level corresponding to a white level when said cable is not electrically connected to said input terminals; and
   (e) three D.C. restore circuits for clamping black levels of said video signals to a fixed level by peak clamping circuits.

* * * * *